Nov. 25, 1924.
H. C. WINN
COASTING SLED
Filed Jan. 29, 1923
1,516,941
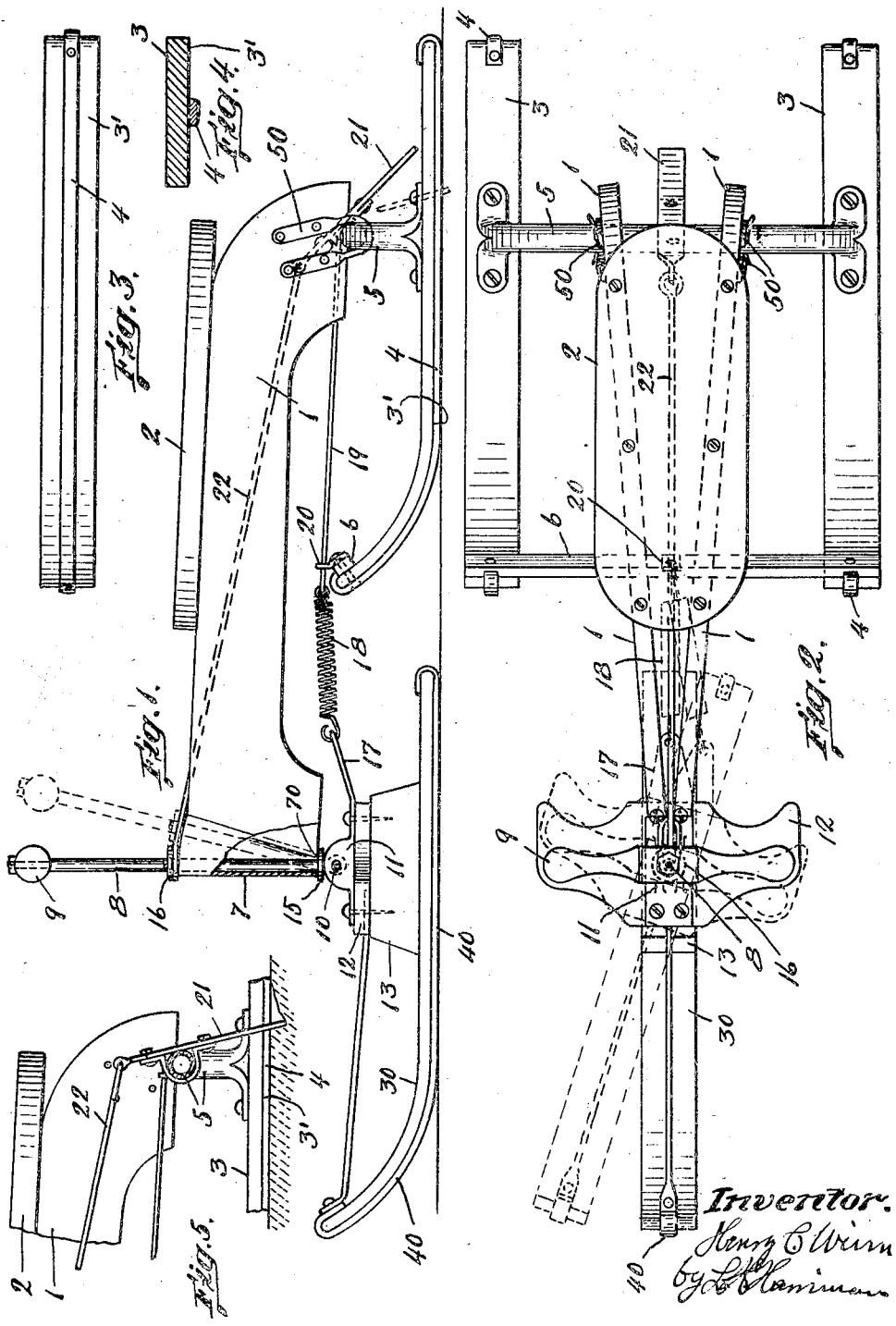

Patented Nov. 25, 1924.

1,516,941

UNITED STATES PATENT OFFICE.

HENRY C. WINN, OF HAVERHILL, MASSACHUSETTS.

COASTING SLED.

Application filed January 29, 1923. Serial No. 615,760.

*To all whom it may concern:*

Be it known that I, HENRY C. WINN, a citizen of the United States, a resident of Haverhill, in the county of Essex and State of Massachusetts, have invented an Improvement in Coasting Sleds, of which the following is a specification.

This invention relates to that class of coasting sleds which comprise a frame having runners connected thereto, and provided with means whereby the front runner, or runners may be swung to steer the same.

The objects of my invention are to provide a sled, of the character above referred to, having means whereby the steering means may be conveniently operated to apply a brake, so that the operator will not have to change the position of his hands or feet in applying the same, and to provide a sled having a form of runner which is suitable either for snow, which is comparatively soft, or for hard snow crust, or ice.

Other objects of the invention are to improve the construction of a device of this character in various details, as will hereafter appear.

I accomplish these objects in the manner hereinafter described, and as illustrated in the accompanying drawing, in which a preferred embodiment of my invention is shown, and in which:—

Fig. 1 is a side elevation, partly in section, and

Fig 2 a plan view of said preferred embodiment.

Fig. 3 is a bottom view of one of the runners and

Fig. 4 is a transverse sectional view thereof, and

Fig. 5 is a detail sectional view of a portion of the brake mechanism.

As shown in the drawing, the sled comprises a main body, or frame 1, having a seat 2 thereon, said frame being preferably composed of two portions which extend somewhat divergently from front to rear, and which, when constructed as illustrated, are preferably formed of wood. A pair of rear runners are provided, each of which comprises a main runner portion 3 of wood, having a transversely flat under, or runner surface 3', and a supplemental runner 4, which consists of a metal rod arranged on said surface 3', in the middle and extending from end to end thereof, the metal runner 4 being secured at its ends to the adjacent portions of the wooded runner 3 by bolts, or other suitable means. The runners are thus provided with two runner surfaces, one of which is broad and flat and the other of which is relatively narrow, the runner surface of the latter being disposed at a sufficient distance beneath the surface 3' to hold the same out of contact with the supporting surface when it is hard, and being adapted to cut into the same when it is somewhat soft, so that both surfaces will act as a runner surface.

The two wooden runner portions 3 have a U-shaped, transversely disposed connecting bar 5 extending therebetween, and rigidly connected thereto, said bar being connected to the bottom portion of the rear end of the frame by straps 50, in which said bar is adapted to oscillate, so that said runners are adapted to swing about a transverse axis. The front ends of the runners 3 are connected by a cross bar 6.

The front end portion of the frame 1 is provided with a metal casing 7, in which a steering rod 8, having a transverse steering handle 9 on its upper end, is mounted, said rod being connected by a transverse pivot bolt 10, at its lower end, to a bracket 11, which is secured to the upper side of a foot bar 12, the latter being secured to the upper side of a block 13, which is mounted on the wooden runner strip 30 of the front runner. Said front runner is similar in construction to the rear runner, having a metal runner rod 40 extending from end to end of the wooden runner surface in the middle thereof. The casing 7 is formed to provide a vertical chamber, which extends from top to bottom thereof. The front and rear ends of said chamber extend convergently from the bottom and the sides thereof are parallel, the distance between said sides, and between the ends at the bottom being slightly greater than the diameter of rod 8, so that the latter may be swung therein with the lower end of the casing acting as a fulcrum, and the sides acting as guide-ways to hold the rod in a vertical plane in all positions thereof.

A washer 15 is mounted on the rod 8 at the underside of the casing 7, to provide a flat supporting bearing for said casing, and a washer 16 is also provided on the rod above the casing and is held in position by a cotter pin, or other convenient means, to prevent upward movement of the casing on the rod. An arm 17 is rigidly connected to, and extended rearwardly from the bracket 11, directly over the middle of the front runner, and a coiled spring 18 is attached, at its front end, to said arm and at its rear end to a rod 19, which extends thru a bracket 20 on the bar 6 and is connected to the cross-bar 5.

A drag brake 21 is pivotally mounted on the middle portion of the cross-bar 5, one end portion being adapted to engage the snow, or other supporting surface, and the opposite end being connected by a stiff rod 22 to the steering rod 8, above the casing 7.

With the above described construction the spring 18 permits universal swinging and turning movement of the front runner, and, therefore, at all times tends to return the same to a position in which it is horizontal and parallel to the other runners. Under normal conditions the steering rod 8 will be held against the front end of the casing 7, as indicated in the full line position of Fig. 1, and the sled will be steered in the usual manner of a sled of this type. If, however, it is desired to apply the brake, the operator will pull back on the steering handle, causing the rod 8 to swing on a fulcrum 70 at the lower end of the casing 7. This will cause the rod 22 to be pushed rearward, thereby causing the lower end of the brake 21 to be swung towards the ground, so as to drag, as indicated in Fig. 5 and in the dotted line position of Fig. 1. The action of swinging back the steering rod in this manner causes its lower portion to be swung forward, so that the distance between the front and rear runners will be increased and additional tension, consequently, will be placed on the spring 18, which thus tends to swing the steering rod back to its normal position. The spring 18 thus performs the double function of yieldingly holding the front runner against movement in all directions from its normal position and of yieldingly holding the steering rod in the normal position thereof.

It is to be further noted that, as the feet of the operator will be braced against the foot bar 12, when he pulls back on the steering rod, to apply the brake, and that, as the front runner will, in effect, be moved forward, by the action of the rod when swung rearward, the action of applying the brake will be caused by pushing forward with the feet, as well as by pulling rearward with the hands. As the operator will naturally push forward with his feet, when he pulls rearward with his hands, and both will be the motions which he would naturally make under the circumstances, the particular means above described, for applying the brake, is especially effective.

The particular construction of runner shown is especially advantageous, as the wide runner surface enables the sled to be effectively used on comparatively soft snow, and yet said wide runner will not act as a drag on a hard surface, as it will be held out of contact therewith and the entire weight will then be borne by the narrow metal runner, which will slide more readily on a hard surface than the wide runner. The narrow runner will also tend to prevent slewing under all conditions and will enable the sled to be steered more effectively.

While the construction shown is a preferable one, various changes may be made in the main frame and in various other details without departing from the spirit and scope of my invention.

I claim:

1. A coasting sled comprising a frame having front and rear runners, a vertically disposed steering rod mounted for rotation in the front end of the frame and connected to the front runner whereby the latter may be turned thereby, means permitting the upper portion of said rod to be swung rearward, a brake device and connections between said brake device and said upper portion of said rod, whereby the brake device will be moved into operative position when said rod portion is swung rearward.

2. A coasting sled comprising a frame having front and rear runners, a steering rod mounted for rotation in the front end of said frame in a vertically disposed position and having a pivotal connection with said front runner, permitting rearward swinging movement relatively thereto, means permitting rearward swinging movement of said rod relatively to the frame and for guiding the same during said movement, a brake device, and connections between said rod and said brake device whereby, when said rod is swung rearward the brake device will be moved to operative position.

3. A coasting sled comprising a frame having front and rear runners, a steering rod mounted for rotation in the front end of said frame in a vertically disposed position and having a pivotal connection with said front runner, permitting rearward swinging movement relatively thereto, means permitting rearward swinging movement of said rod relatively to the frame and for guiding the same during said movement, said frame having a fulcrum portion arranged to engage the rod above its pivotal connection with the runner, a spring connecting said front and rear runners and acting to hold said rod in its forward position, a brake device, and connections between said rod and brake device for moving the latter to its operative position when the rod is swung rearward.

4. A coasting sled comprising a frame having runners at front and rear, a steering rod having a handle at its upper end, said rod being mounted for rotation in a normally upright position in the frame and arranged for rearward swinging movement from said position, and said frame having a fulcrum arranged to engage said rod at a distance above its lower end and at its rear side, when the rod is swung rearward, and said rod having a pivotal connection with the front runner, a foot rest connected to said front runner, a brake device connected to said frame, and connections between said brake device and steering rod arranged to move the former into operative position when the handle of the latter is moved rearward.

5. A coasting sled comprising a longitudinally extending frame, a pair of rear runners connected to the rear end of said frame and arranged to swing about a transverse axis relatively thereto, a vertically disposed steering rod mounted for rotation in the front end of said frame, a front runner disposed midway of said rear runners and having a transverse pivotal connection with the lower end of said rod, and an expansion spring connecting said front runners and said rear runners and arranged to permit universal swinging and turning movement of said front runner from its middle position and normally acting to retain the same in said position.

In testimony whereof, I have signed my name to this specification.

HENRY C. WINN.